United States Patent
Kuik et al.

(10) Patent No.: US 8,385,202 B2
(45) Date of Patent: Feb. 26, 2013

(54) VIRTUAL SWITCH QUALITY OF SERVICE FOR VIRTUAL MACHINES

(75) Inventors: Timothy Kuik, Lino Lakes, MN (US); Anuraag Mittal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 12/229,780

(22) Filed: Aug. 27, 2008

(65) Prior Publication Data

US 2010/0054129 A1  Mar. 4, 2010

(51) Int. Cl.
*G01R 31/08* (2006.01)
(52) U.S. Cl. ..................... 370/235
(58) Field of Classification Search ............ None
See application file for complete search history.

(56) References Cited

U.S. PATENT DOCUMENTS

| | | |
|---|---|---|
| 2002/0085559 A1 | 7/2002 | Gibson et al. |
| 2002/0118644 A1 | 8/2002 | Moir |
| 2006/0018329 A1 | 1/2006 | Nielsen et al. |
| 2011/0035494 A1* | 2/2011 | Pandey et al. ............ 709/224 |

OTHER PUBLICATIONS

Cisco Systems, Inc., "Cisco Virtual Switch Architecture", copyright 1992-2002, pp. 1-6, Cisco Systems, Inc., San Jose, CA, USA.
PCT Search Report and Written Opinion for PCT/US2009/054868 dated Oct. 15, 2009.

* cited by examiner

*Primary Examiner* — Kwang B Yao
*Assistant Examiner* — Tung Q Tran
(74) *Attorney, Agent, or Firm* — Patterson & Sheridan, LLP (57) ABSTRACT

In one embodiment a method includes selectively controlling a virtual network switch to control a quality of service (QoS) for a flow associated with a virtual machine (VM). Controlling the QoS may include controlling the virtual switch to provide classification, congestion management, congestion avoidance, bandwidth limiting, traffic shaping, and/or priority manipulation. The method may also include migrating a policy associated with a virtual interface between the VM and the virtual switch from a first server to a second server when the VM is to be migrated from the first server to the second server. The migration may also include moving statistics associated with the policy. The method may include selectively adapting the policy or an existing policy on the receiving server when a discrepancy is detected between the policies. The method may include reserving resources to provide guaranteed minimum bandwidth, even without control of an ingress and egress queue.

19 Claims, 6 Drawing Sheets

VIRTUAL SWITCH QUALITY OF SERVICE FOR VIRTUAL MACHINES

TECHNICAL FIELD

This disclosure relates generally to providing quality of service (QoS) for a virtual machine (VM) interacting with a virtual switch. More specifically, the disclosure relates to selectively providing different QoS based on adaptable policies that can migrate with a VM.

BACKGROUND

A network switch is a computer networking device that connects network segments. A network switch may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. A network switch may inspect data packets as they are received. Therefore, a network switch may determine the source and destination of a packet and may forward it accordingly. A network switch may contain some intelligence beyond examine and forward logic. This intelligence facilitates having a network switch perform some management functions. For example, a switch may selectively turn some port range on or off, may selectively establish and/or maintain priority settings for ports, may perform media access control (MAC) filtering to prevent MAC flooding, may use a spanning tree protocol, may perform link aggregation, and so on. Typically, if these management functions have been performed, they have been performed in actual (e.g., physical) network switches.

Virtualization concerns separating a resource from underlying physical resources. Virtualization techniques can be applied to various devices and programs (e.g., computers, operating systems) including network switches. A virtual machine (VM) is a representation of a real machine using software that provides an operating environment that can run a host and its applications. A VM may be used to run applications and/or may be used as an appliance for a designated purpose and/or function. Even though a network switch may be virtualized, ultimately a virtual switch may be connected in some manner to an actual switch. One skilled in the art will appreciate that in one example a virtual switch could connect virtual machines on a single physical server and thus may not be connected to an actual switch.

Virtualization allows one device (e.g., computer, switch) do the job of multiple devices by sharing the resources of the single device across multiple environments. A VM may have a number of virtual ports, which may also be referred to as virtual interfaces, that connect to a virtual switch. The virtual switch provides connectivity to the physical ports. Conventional virtual switches, to the extent they provided any QoS at all, typically only provided a single service that was limited to controlling the ingress interface to a VM using, for example, bandwidth limiting of traffic. A VM is a tightly isolated software container that can run its own operating system and applications as if it was a physical machine. A VM behaves like a physical machine and has its own virtual (e.g., software based) processor, memory, network interface card(s), and so on. If a VM or other virtual device could think, it would think that it was a real (e.g., physical) device. However, a virtual device may be pure software and thus may be completely independent from an underlying physical hardware. Therefore, a virtual device may be migrated between different underlying physical hardwares.

BRIEF DESCRIPTION OF THE DRAWINGS

In the accompanying drawings, which illustrate various embodiments, it will be appreciated that the illustrated element boundaries (e.g., boxes, groups of boxes, or other shapes) are representative and not limiting. One of ordinary skill in the art will appreciate that in some embodiments one element may be designed as multiple elements, that multiple elements may be designed as one element, that an element shown as an internal component of another element may be implemented as an external component and vice versa, and so on. Furthermore, elements may not be drawn to scale.

OVERVIEW

In one embodiment, a network switch may be virtualized and may provide full QoS. References to "one embodiment", "an embodiment", "one example", "an example", and so on, indicate that the embodiment(s) or example(s) so described may include a particular feature, property, element, or limitation, but that not every embodiment or example necessarily includes that particular item. Repeated use of the phrase "in one embodiment" does not necessarily refer to the same embodiment, though it may.

A multiplane architectural framework associated with a virtual switch may include an adaptation plane, a switching plane, a control plane, an application plane, and a management plane. The adaptation plane supports the physical interface to a user or other network element, while the switching plane supports the actual switching fabric by which physical interfaces are connected. The control plane facilitates managing network service events and controlling the adaptation and switching planes. The application and management planes provide services that use the capabilities of the control plane. These planes facilitate providing QoS in a virtualized switch.

In one example, a virtual switch may support multiple simultaneous controllers for independent virtual switch functions and may also support dynamically allocating queues for multiple controllers. In one example, a virtual switch may provide QoS for different kinds of services. In one example, a virtual switch may separate internet protocol (IP) flows and asynchronous transfer mode (ATM) based connections into separate queues.

DESCRIPTION OF EXAMPLE EMBODIMENTS

Example embodiments concern virtual switch based QoS for VMs. Virtual switches are implemented on a host (e.g., server, physical machine). VMs are also implemented on a host. A virtual switch may be implemented at various locations in an architecture including, for example, within a hypervisor, within a VM, and so on. Virtual switches interact with VMs. Thus, a virtual switch may provide QoS for a VM. A VM may communicate with another VM located on the same host, with another VM located on another host, with another actual device located on a different host, and so on. These communications may flow through a virtual switch to which the VM is logically connected. The VM may be logically connected to the virtual switch through a set of virtual interfaces. The communications may also flow through a physical switch to which the virtual switch is connected.

In the context of a network switch, real or virtual, QoS refers to selectively providing differentiated services to some packets or flows than to other packets or flows. A flow may be identified by a combination of source and destination addresses, source and destination socket numbers, a session identifier, a class of service (COS) field, and other items. Some traffic (e.g., real time, interactive) may desire priority including dedicated bandwidth, controlled jitter, controlled latency, improved loss characteristics, and so on. QoS may include providing better service to certain flow(s) based on raising and/or lowering the priority of a flow(s). QoS may include controlling and predictably servicing a variety of networked applications and traffic types.

Service levels refer to the actual end-to-end QoS capabilities, which refers to the capability of a network to deliver service for specific network traffic from end-to-end. Services differ in their level of QoS strictness, which describes bindings between the service and bandwidth, delay, and so on. Different QoS levels include, best-effort service, differentiated service, and guaranteed service. Best-effort service typically provides no differentiation between flows and may be referred to as no QoS. Differentiated service provides some differentiation between flows but the differentiation corresponds to a statistical preference, not a guarantee. Thus, differentiated service is sometimes referred to as soft QoS. Guaranteed service provides an absolute reservation of network resources for specific traffic. Thus, guaranteed service is sometimes referred to as hard QoS. Different service levels may be requested using, for example, Resource Reservation Protocol (RSVP), which is an Internet Engineering Task Force (IETF) Internet Standard (RFC 2205) protocol for allowing an application to dynamically reserve bandwidth. In one example, a virtual switch may be controlled to provide these different service levels.

While service levels refer to end-to-end capabilities, individual QoS tools may deal with individual issues. Individual QoS tools may include, for example, classification/marking tools, congestion management tools, congestion avoidance tools, shaping/policing tools, priority manipulation tools, and bandwidth limiting tools. In one example, a virtual switch may be controlled to provide these individual tools and/or combinations thereof.

Classification concerns, for example, identifying flows. In the context of a policy, classification may lead to marking packets. To provide preferential treatment to a certain type of traffic, packets associated with that traffic must be identifiable. The identification may depend on marking traffic. Therefore, an example virtual switch may be controlled to selectively perform marking and identification. "Classification", as used in the claims, refers to this QoS tool. While a classification may be made based on flows, one skilled in the art will appreciate that classification may be performed based on other items. For example, classification may be based on TCP/IP flow, DSCP, IP precedence, COS, discard class, QOS group, IP packet length, RTP port list, a classification rule set reference, an access control list specification, and so on. TCP/IP refers to Transport Control Protocol/Internet Protocol. IP refers to Internet Protocol. DSCP refers to Differentiated Services Code Point. COS refers to IEEE 802.1Q class of service. QOS refers to Quality of Service. RTP refers to real time transport protocol.

Congestion management concerns handling the situation when an amount of traffic exceeds the speed of a link. Traffic may be "bursty" and thus the amount of traffic may exceed the speed of a link. Congestion management includes queuing and servicing flows in different ways to provide preferential treatment to a flow(s). An example virtual switch may be controlled to selectively provide congestion management by, for example, providing multiple queues with different priorities for flows with different classifications. "Congestion management", as used in the claims, refers to this QoS tool.

Congestion avoidance concerns preventing a queue from filling to allow room for high priority traffic to enter a queue. An example virtual switch may be controlled to selectively provide congestion avoidance. "Congestion avoidance", as used in the claims, refers to this QoS tool. Congestion avoidance may include selectively dropping packets of lower priority before dropping packets of a higher priority to leave room in a queue(s) for higher priority packets.

Priority manipulation concerns selectively increasing or decreasing the priority of packets associated with a flow. A packet may have header bits or other identifier bits that describe the priority of a packet. The priority may be a value in a range. Different priorities may receive more or less bandwidth, may have more or less space available in a queue, may have larger or smaller queues, may be routed at an earlier or later time, and so on. Thus, priority manipulation facilitates providing different handling to packets based on the priority identifiers. "Priority manipulation", as used in the claims, refers to this QoS tool.

Traffic shaping concerns creating a traffic flow that limits the full bandwidth potential of a flow(s). Traffic shaping involves dealing with the fact that traffic may travel over links with different speeds. For example, an ingress link may have a first higher speed while an egress link may have a second lower speed. Thus, traffic shaping may include applying intelligence to an ingress link to prevent overflows due to the mismatch between the ingress speed and the egress speed.

Bandwidth limiting concerns limiting the amount of bandwidth that a flow can consume. A virtual switch may have a total available bandwidth. This bandwidth may be partitioned between flows. Bandwidth limiting facilitates making more of that bandwidth available to a first flow while providing less of that bandwidth to a second flow.

QoS may be controlled for an interface based on information available in a policy. A policy may be defined for a virtual interface for a VM. A policy may also be defined for a physical interface to a physical device. A VM may have several virtual interfaces and thus may have several policies defined for the VM. Similarly, a physical device may have several ports and thus may also have several policies defined for the physical device. A policy may be stored, for example, as a file, as a record, as a set of XML attribute/value pairs, and so on.

A VM may migrate from a first server to a second server. Thus, in one example, a policy may migrate with the VM to a receiving machine (e.g., second server). The second server may be associated with a physical network switch and may implement a second virtual network switch. In one example, the virtual interfaces defined for the migrating VM may logically connect to virtual interfaces available to a virtual switch in the receiving server. In different examples, a policy defined for the VM on the first server may or may not match a policy defined for the VM on the second server. Thus, in one example, a migrating policy and/or a policy present on a receiving machine may be automatically adapted when a mismatch is detected when a VM and a policy are migrated. In one example, statistics associated with a VM, a virtual switch, a virtual interface, and/or a policy may also migrate with the VM. For example, a count of a number of dropped packets may be migrated along with the VM.

Associating a policy definition with a VM interface facilitates moving the policy with the VM when the VM migrates to another server. Policy definition is a global task. Deciding when and/or where to apply a policy is a second, distinct task. Thus, a physical machine (e.g., server) and physical device (e.g., network switch) may choose not to use a policy defined for a virtual interface between a VM and a virtual switch. However, tying the policy definition to the VM interface makes it relatively easy to plug the VM into a receiving server and to implement QoS on the receiving server based on the migrated policy. Consider that a set of VMs may be created on a virtual server. Each VM may be connected to the virtual switch associated with the virtual server by one or more virtual interfaces. A VM may then be migrated to another server. In this situation, the virtual interfaces associated with the VM may be "plugged in" to the new virtual switch on the new virtual server. Thus, a policy can be migrated to a new server and applied on that new server.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
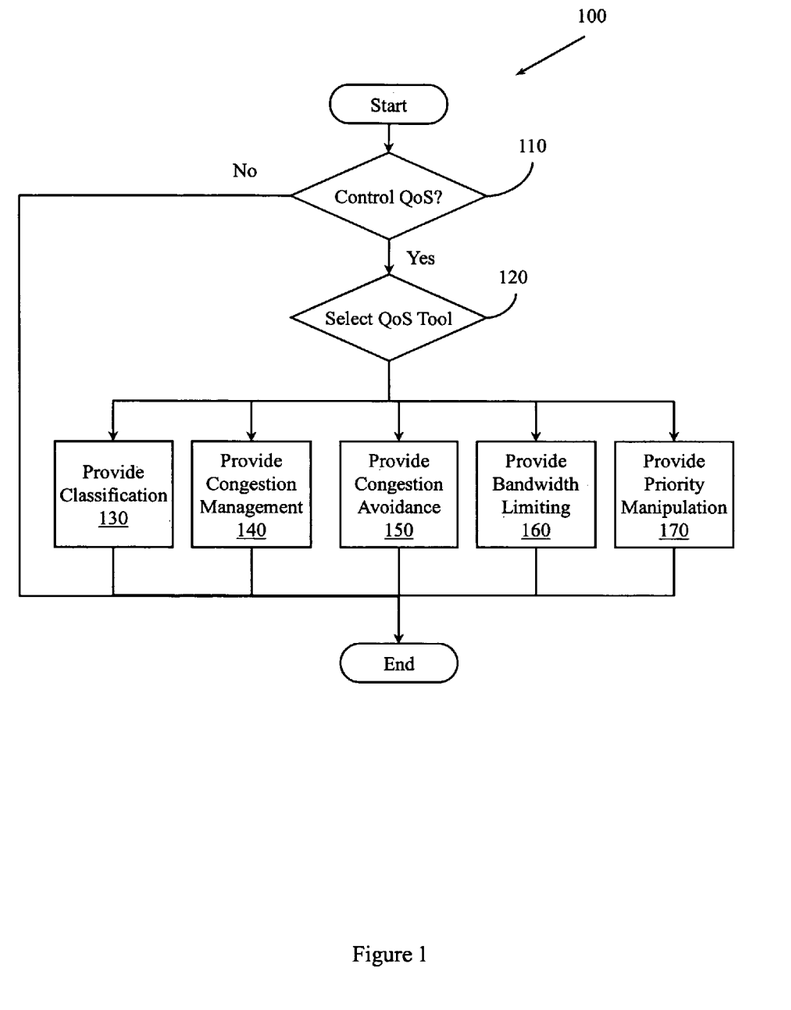
FIG. 1 illustrates an example method associated with virtual switch QoS for VMs.

FIG. 1 illustrates a method 100 associated with virtual switch QoS for virtual machines. Method 100 includes, at 110, determining whether to control QoS for a virtual switch associated with a VM. This determination facilitates selectively controlling the virtual network switch to control QoS for a flow associated with a VM where the flow transits the virtual network switch. The determination may be associated with information stored in a policy. The determination may also be associated with a user configured and/or automatically configured value for a virtual switch setting. If the determination at 110 is no, then processing may conclude. If the determination at 110 is yes, then processing may advance to 120 where a selection of available QoS tools is made. In one example, method 100 may not include the determination at 110 and may, therefore, automatically provide the policy-based pre-queuing operations described in connection with method 100.

In one example, the selection at 120 may select one QoS tool to provide. In another example, the selection may include selecting two or more QoS tools to provide. Thus, there are multiple possible paths from selection 120. In one example, method 100 may include selectively controlling the virtual network switch to control QoS by providing a classification service at 130. Recall that classification may include both identification and marking. In another example, method 100 may include selectively controlling the virtual network switch to control QoS by providing a congestion management service at 140. Recall that congestion management may deal with handling a situation where an amount of traffic exceeds the speed of a link. While providing a classification service at 130 and providing a congestion management service at 140 are illustrated as separate actions, in one example a single logic or process may provide both of these QoS tools. One skilled in the art will appreciate that these QoS services, and the other illustrated QoS services may be provided by an omnibus application, by distributed co-operating applications, by a set of interacting processes, by circuits, by an application specific integrated circuit (ASIC), by other hardware, and so on.

Method 100 may also include, at 150, providing a congestion avoidance service. The congestion avoidance service may include, for example, preventing a queue or queues associated with the virtual switch from filling. Method 100 may also include, at 160 providing a bandwidth limiting service. Providing the bandwidth limiting service may include reserving a guaranteed minimum bandwidth for a class of traffic for the virtual network switch. Reserving this guaranteed minimum bandwidth may occur when it is detected that the method 100 does not control an ingress queue in the virtual network switch and does not control scheduling in the virtual network switch. This reservation may occur in a situation where traffic arrives at an actual/physical interface. In one case, a virtual switch may not implement QoS on an ingress path from the actual switch and may not have access to the actual switch from a scheduling point of view. Therefore, reserving the bandwidth may involve dropping other traffic to reserve spots for guaranteed traffic between the virtual switch and a VM.

Method 100 may also include, at 170, providing a priority manipulation service. This may include selectively raising the priority of a flow(s) and selectively lowering the priority of another flow(s). While multiple paths are illustrated from the selection at 120, method 100 may include providing subsets of the available QoS tools. Therefore, in one example, method 100 may include selectively controlling the virtual network switch to control the QoS by providing two or more of, classification, congestion management, congestion avoidance, bandwidth limiting, priority manipulation, and/or traffic shaping. While classification, congestion management, congestion avoidance, bandwidth limiting, priority manipulation, and traffic shaping are described, it is to be appreciated that method 100 may, most generally, selectively control QoS for a virtual switch.

While FIG. 1 illustrates various actions occurring in serial, it is to be appreciated that various actions illustrated in method 100 could occur substantially in parallel. By way of illustration, a first process could provide classification, a second process could provide congestion management, a third process could provide congestion avoidance, and a fourth process could control selection between the QoS tools. While four processes are described, it is to be appreciated that a greater and/or lesser number of processes could be employed and that lightweight processes, regular processes, threads, and other approaches could be employed.

The determination at 110 may be, for example, a three way determination. For example, the determination at 110 may decide whether to provide best effort QoS (e.g., no QoS), differentiation QoS (e.g., soft QoS), or guaranteed QoS (e.g., hard QoS). If the determination at 110 is to provide no QoS, then method 100 may conclude. But if the determination at 110 is to provide hard QoS or soft QoS, then the paths through 120 and 130-170 may be followed.

Figure 2:
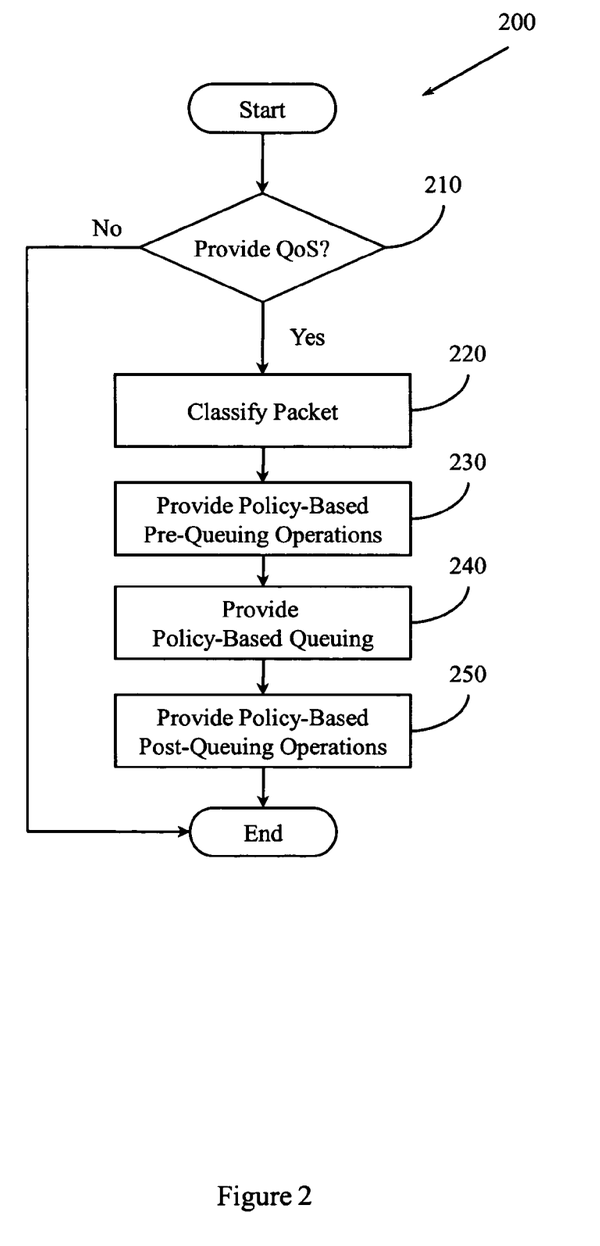
FIG. 2 illustrates an example method associated with virtual switch QoS for VMs.

FIG. 2 illustrates a method 200 associated with providing virtual switch QoS for VMs. Method 200 includes, at 210, determining whether to provide QoS. If the determination at 210 is No, then method 200 may conclude. If the determination at 210 is Yes, then processing may proceed to 220.

Method 200 includes, at 220, classifying a packet. One skilled in the art will appreciate that a packet may be classified using various techniques and based on various data. Method 200 may also include, at 230, providing policy-based pre-queuing operations. The policy-based pre-queuing operations may include, for example, the congestion management, congestion avoidance, bandwidth limiting, and priority manipulation described in connection with method 100. Which operations are performed may depend, for example, on the packet classification as determined at 220.

Method 200 may also include, at 240, providing policy-based queuing and, at 250, providing policy based post-queuing operations. In one example, either and ingress and/or egress queue may not be controllable, which may impact the actions performed at 230, 240, and/or 250. By way of illustration, resources may need to be reserved to facilitate guaranteeing a minimum bandwidth.

Figure 3:
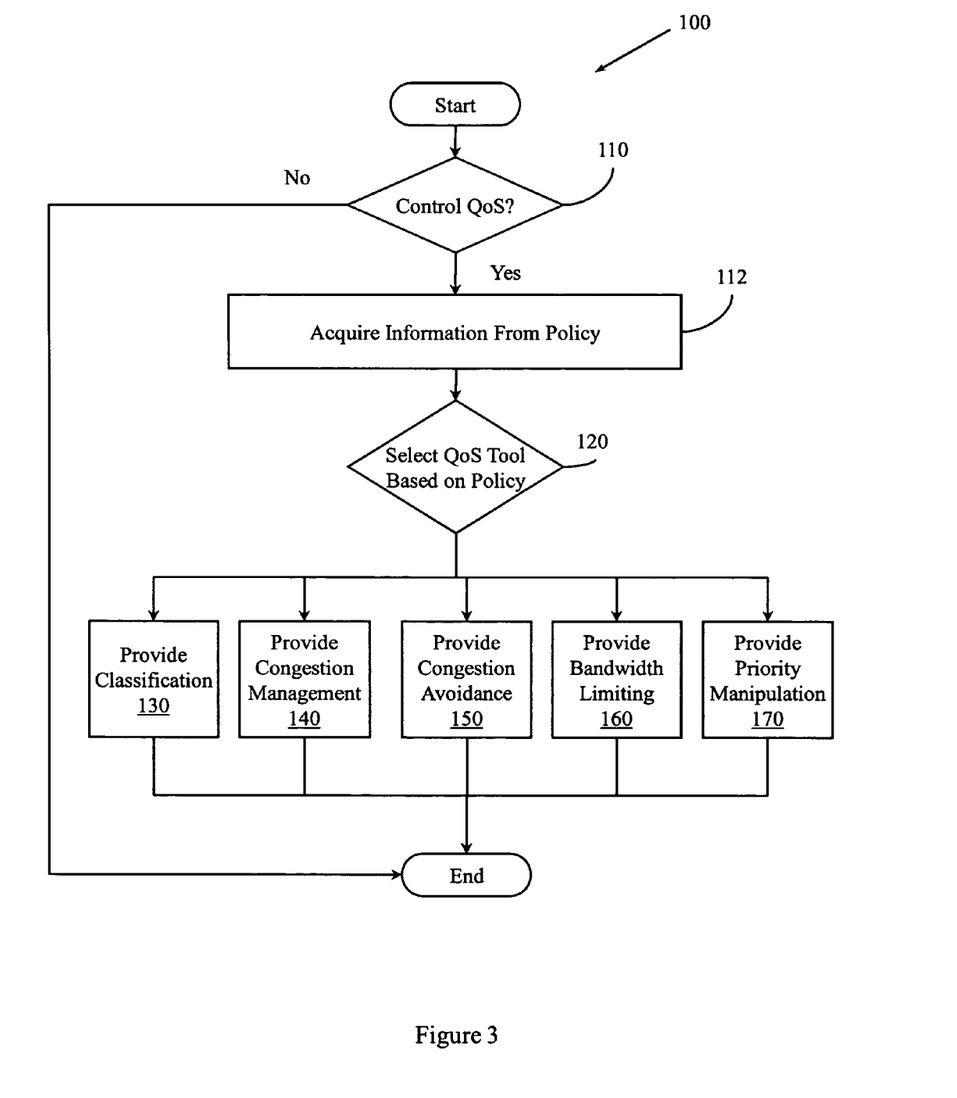
FIG. 3 illustrates an example method associated with virtual switch QoS for VMs.

FIG. 3 illustrates another embodiment of method 100. In this embodiment, method 100 includes, at 112, acquiring information from a policy defined for a virtual interface associated with the VM. The virtual interface may be associated with an ingress interface to the VM, and/or an egress interface from the VM. Thus, it is to be appreciated that QoS may be provided on both ingress and egress processing. Selection of QoS tools at 120 may be controlled, at least in part, by the information from the policy acquired at 112. In different embodiments the policy may be associated with virtual interfaces and/or physical interfaces. Therefore, in one example, acquiring the information at 112 may include acquiring information from a policy defined for a physical interface associated with a physical network switch with which the virtual switch communicates. Once again the physical interface may be an ingress interface to the physical network switch and/or an egress interface from the physical network switch.

Figure 4:
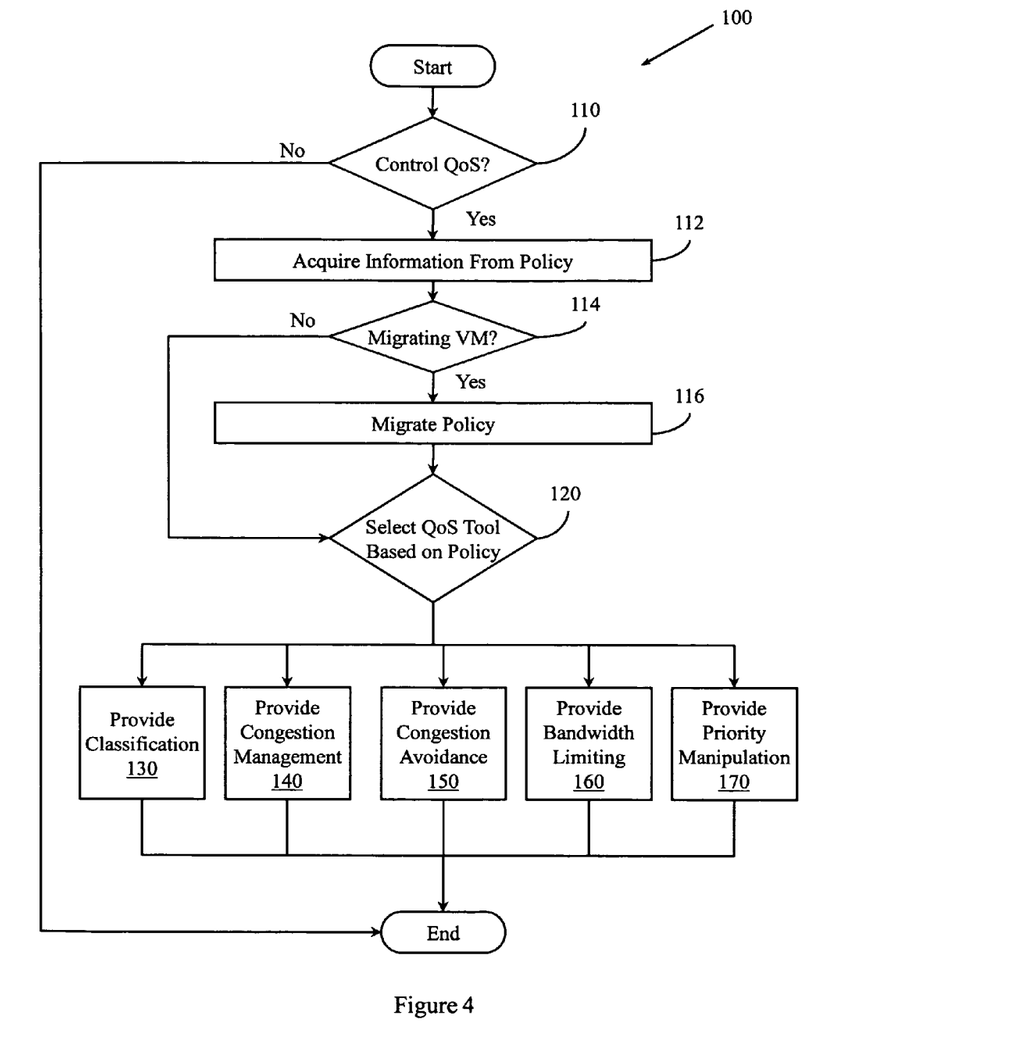
FIG. 4 illustrates an example method associated with virtual switch QoS for VMs.

FIG. 4 illustrates another embodiment of method 100. In this embodiment, a determination is made at 114 concerning whether a VM with which a virtual switch is associated is being migrated. If the determination at 114 is no, then processing continues at 120. However, if the determination at 114 is yes, then the policy accessed at 112 may be migrated to the device (e.g., server) receiving the VM. Migrating the policy may include, for example, copying a file from a first (e.g., providing) server to a second (e.g., receiving) server, sending a record to the receiving server, invoking a method on the receiving server, communicating with a migration server, and so on. In one example, there may be statistics associated with a policy being migrated. For example, a number of packets may have been dropped based on information in the policy. Thus, in one example, migrating the policy at 116 may include migrating statistics data associated with the policy to the receiving server. While a number of dropped packets is described, one skilled in the art will appreciate that the statistics may include other values (e.g., average queue size, maximum queue size, maximum priority handled).

As described above, the policy being migrated at 116 may not be received issue free at the receiving server. For example, the policy may conflict with an existing policy on the receiving server. Therefore, method 100 may also include, in the migrating of the policy at 116, selectively adapting the policy. The selective adaptation may be associated with resolving a conflict between policies, optimizing a policy based on conditions at the receiving server (e.g., communication link speeds, memory available, queue sizes in a virtual switch), and so on.

In one example, a method may be implemented as computer executable instructions. Thus, in one example, computer-executable instructions to perform method 100 may be stored on a computer-readable medium encoded in a tangible logic. "Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. While executable instructions associated with method 100 are described as being stored on a computer-readable medium, it is to be appreciated that executable instructions associated with other embodiments of method 100 described herein may also be stored on a computer-readable medium and/or encoded in a tangible medium.

Figure 5:
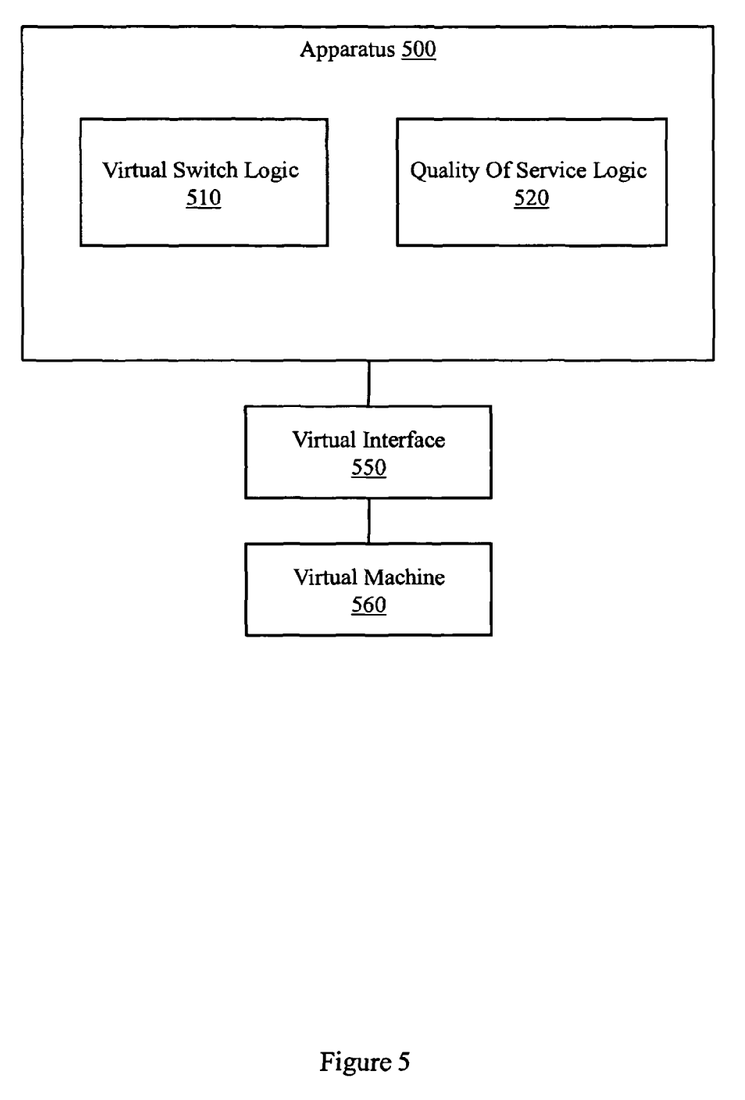
FIG. 5 illustrates an example system associated with virtual switch QoS for VMs.

FIG. 5 illustrates an apparatus 500 associated with virtual switch QoS for VMs. Apparatus 500 may be, for example, a server hosting a virtual switch. Apparatus 500 includes a virtual switch logic 510. Virtual switch logic 510 may be, for example, an application specific integrated circuit (ASIC) provided to apparatus 500. Virtual switch logic 510 may also be, for example, executable instructions downloaded into apparatus 500. Virtual switch logic 510 is to provide a virtual switch for a virtual machine 560. The virtual machine 560 and the virtual switch are provided by a server. A virtual interface 550 connects the virtual machine 560 and the virtual switch provided by the virtual switch logic 510.

Apparatus 500 also includes a quality of service (QoS) logic 520. QoS logic 520 is to provide QoS for the virtual machine 560 with respect to packets flowing through the virtual interface 550 between the virtual machine 560 and the virtual switch provided by the virtual switch logic 510. QoS logic 520 may provide, for example, classification, congestion management, congestion avoidance, bandwidth limiting, and priority manipulation. While five QoS tools are illustrated, it is to be appreciated that a greater and/or lesser number of QoS tools could be provided.

Figure 6:
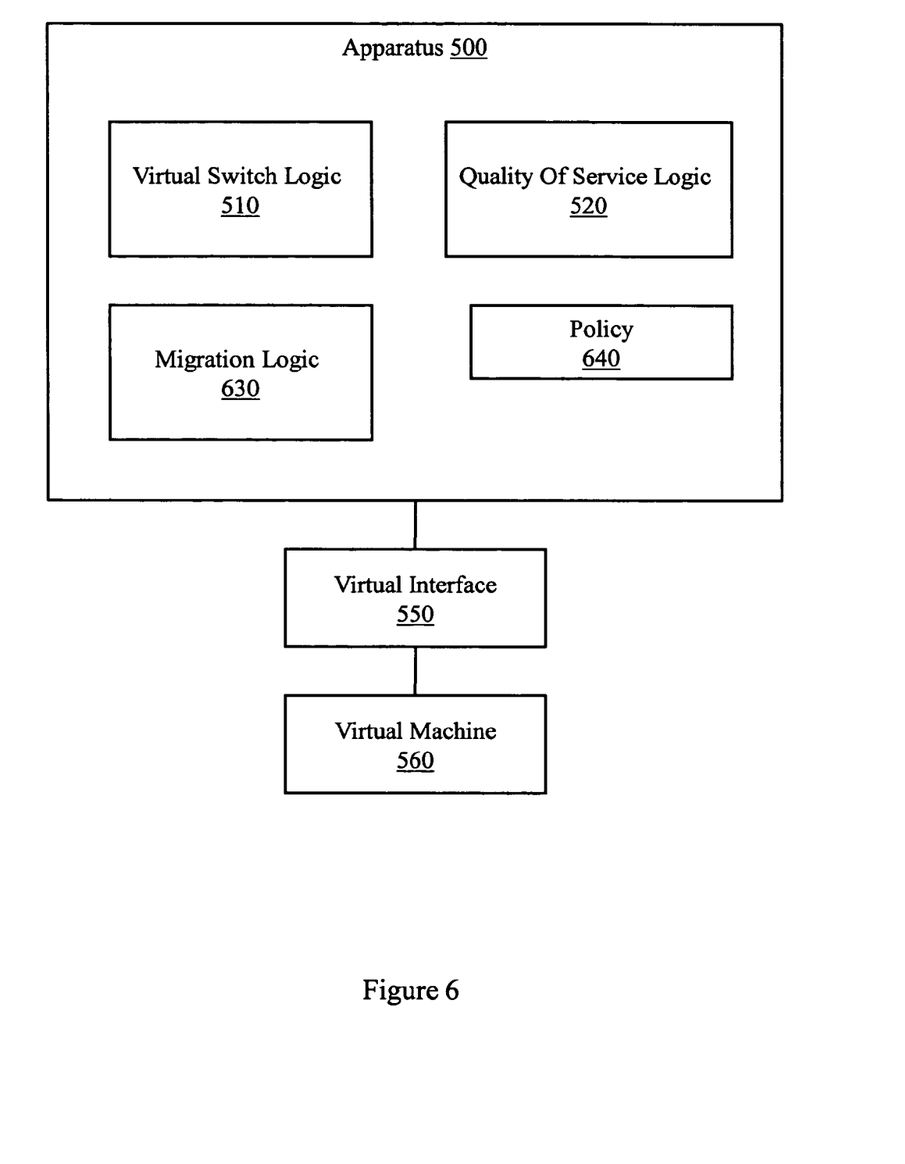
FIG. 6 illustrates an example system associated with virtual switch QoS for VMs.

FIG. 6 illustrates another embodiment of apparatus 500. In this embodiment, apparatus 500 includes a migration logic 630 to selectively migrate a policy 640 to a receiving server. The policy 640 may be migrated to the receiving server upon determining that the virtual machine 560 is to be migrated from its current server to the receiving server. The policy 640 may be associated with a virtual interface 550 between the virtual switch and the virtual machine 560. The policy 640 may store information about QoS to be associated with an ingress interface to the virtual machine 560, and/or an egress interface from the virtual machine 560. Migrating the policy 640 may include copying a file to a receiving server, providing a record to a receiving server, manipulating configuration values in a receiving server, providing XML attribute/value pairs to a receiving server, and so on. Most generally, virtual switch logic 510 and QoS logic 520 provide means for providing a virtual switch with QoS support for traffic transiting the virtual switch where the virtual switch is hosted on a server that provides virtualization.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Gamer, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
   migrating (i) a virtual machine (VM) and (ii) quality of service (QoS) policy, from a first physical server, to a second physical server distinct from the first physical server, wherein the QoS policy corresponds to a virtual network switch associated with the migrated VM;
   upon determining that a conflict exists between the migrated QoS policy and a second QoS policy on the second physical server, adapting the migrated QoS policy, comprising:
   determining at least one hardware characteristic of the second physical server;
   determining at least one configuration characteristic of the migrated VM; and
   altering the migrated QoS policy to resolve the conflict, based on the at least one hardware characteristic of the second physical server and the at least one configuration characteristic of the migrated VM;
   passing a data flow through the virtual network switch associated with the migrated VM on the second physical server; and
   selectively controlling the virtual network switch on the second physical server to control the data flow based on the altered QoS policy.

2. The method of claim 1, wherein selectively controlling the virtual network switch includes controlling the virtual network switch to provide a classification service.

3. The method of claim 1, wherein selectively controlling the virtual network switch includes controlling the virtual network switch to provide a congestion management service.

4. The method of claim 1, wherein selectively controlling the virtual network switch includes controlling the virtual network switch to provide a congestion avoidance service.

5. The method of claim 1, wherein selectively controlling the virtual network switch includes controlling the virtual network switch to provide a bandwidth limiting service.

6. The method of claim 5, further comprising providing a guaranteed minimum bandwidth through the virtual network switch.

7. The method of claim 1, wherein selectively controlling the virtual network switch includes controlling the virtual network switch to provide a priority manipulation service.

8. The method of claim 1, wherein selectively controlling the virtual network switch includes controlling the virtual network switch to selectively provide two or more of, classification, congestion management, congestion avoidance, bandwidth limiting, priority manipulation, and traffic shaping.

9. The method of claim 1, wherein selectively controlling the virtual network switch includes controlling the virtual network switch to selectively provide classification, congestion management, congestion avoidance, bandwidth limiting, and priority manipulation.

10. The method of claim 1, wherein selectively controlling the virtual network switch includes controlling the virtual network switch to selectively provide one of, no QoS, differentiation QoS, and guaranteed QoS.

11. The method of claim 1, wherein selectively controlling the virtual network switch comprises:
    acquiring information from a QoS policy defined for a virtual interface associated with the VM, the virtual interface being one or more of, an ingress interface from the VM, and an egress interface to the VM; and
    selectively controlling the virtual network switch based, at least in part, on the information.

12. The method of claim 1, wherein selectively controlling the virtual network switch comprises:
    acquiring information from a QoS policy defined for a physical interface associated with a physical network switch with which the virtual switch communicates, the physical interface being one of, an ingress interface from the physical network switch and an egress interface to the physical network switch; and
    selectively controlling the virtual network switch based, at least in part, on the information from the QoS policy.

13. The method of claim 1, wherein selectively controlling the virtual network switch comprises:
    acquiring information from a policy defined for an interface associated with the virtual switch, the interface being one or more of, a virtual interface associated with the VM and a physical interface associated with a physical network switch associated with the physical network device; and selectively controlling the virtual switch based, at least in part, on the information.

14. The method of claim 11, further comprising:
moving the virtual machine from the physical server machine to a third physical server machine, different from the physical server machine; and
implementing the QoS policy on the second physical server machine.

15. The method of claim 14, further comprising:
migrating statistics data associated with the QoS policy to the third physical server machine.

16. An apparatus, comprising:
a physical server machine that hosts a virtual machine, wherein the virtual machine was migrated to the physical server machine, from a second physical server machine distinct from the physical server machine; and
a virtual switch, coupled to the virtual machine, wherein a quality of service (QoS) policy corresponding to the virtual switch was migrated to the physical server machine from the second physical server machine, and wherein the virtual switch is configured to:
  upon determining that a conflict exists between the QoS policy and a second QoS policy on the physical server machine, adapt the QoS policy, comprising:
    determine at least one hardware characteristic of the physical server machine;
    determine at least one configuration characteristic of the virtual machine; and
    alter the QoS policy, based on the at least one hardware characteristic of the physical server machine and the at least one configuration characteristics of the virtual machine;
  and
  selectively control the virtual network switch to control a data flow for the virtual machine with respect to packets flowing between the virtual machine and the virtual switch based on the altered QoS policy.

17. The apparatus of claim 16, where the altered QoS policy is configured to provide two or more of, classification, congestion management, congestion avoidance, bandwidth limiting, and priority manipulation.

18. The apparatus of claim 16, further comprising a module configured to:
move the virtual machine from the physical server machine to a third physical server machine, different from the physical server machine; and
implement, on the second physical server machine, QoS for the virtual machine with respect to packets flowing between the virtual machine and the virtual switch.

19. A system, comprising:
a physical server machine;
a virtual machine hosted on the physical server machine, wherein the virtual machine was migrated to the physical server machine, from a second physical server machine distinct from the physical server machine; and
a virtual switch, residing on the virtual machine, wherein a quality of service (QoS) policy corresponding to the virtual switch was migrated to the physical server machine from the second physical server machine, and wherein the virtual switch is configured to:
  upon determining that a conflict exists between the QoS policy and a second QoS policy on the physical server machine, adapt the QoS policy, comprising:
    determine at least one hardware characteristic of the physical server machine;
    determine at least one configuration characteristic of the virtual machine; and
    alter the QoS policy, based on the at least one hardware characteristic of the physical server machine and the at least one configuration characteristics of the virtual machine;
  and
  selectively control the virtual network switch to support traffic to the virtual machine by controlling a data flow for the virtual machine with respect to packets flowing between the virtual machine and the virtual switch based on the altered QoS policy.

* * * * *